No. 836,728. PATENTED NOV. 27, 1906.
J. P. WRIGHT.
WRAPPING MACHINE.
APPLICATION FILED NOV. 25, 1901.

12 SHEETS—SHEET 1.

Witnesses:
Jas. E. Hutchinson.
Henry C. Hazard.

Inventor.
Jacob P. Wright,
by Edwin J. Prindle, his Atty.

No. 836,728. PATENTED NOV. 27, 1906.
J. P. WRIGHT.
WRAPPING MACHINE.
APPLICATION FILED NOV. 25, 1901.

12 SHEETS—SHEET 2.

No. 836,728. PATENTED NOV. 27, 1906.
J. P. WRIGHT.
WRAPPING MACHINE.
APPLICATION FILED NOV. 25, 1901.

12 SHEETS—SHEET 3.

Witnesses:
Jas. E. Hutchinson
Henry C. Hazard.

Inventor.
Jacob P. Wright,
by Edwin J. Prindle,
his Atty.

No. 836,728. PATENTED NOV. 27, 1906.
J. P. WRIGHT.
WRAPPING MACHINE.
APPLICATION FILED NOV. 25, 1901.

12 SHEETS—SHEET 5.

Witnesses:
Jas. E. Hutchinson.
Henry C. Hazard.

Inventor.
Jacob P. Wright,
by Edwin J. Prindle,
his Atty.

No. 836,728. PATENTED NOV. 27, 1906.
J. P. WRIGHT.
WRAPPING MACHINE.
APPLICATION FILED NOV. 25, 1901.
12 SHEETS—SHEET 6.
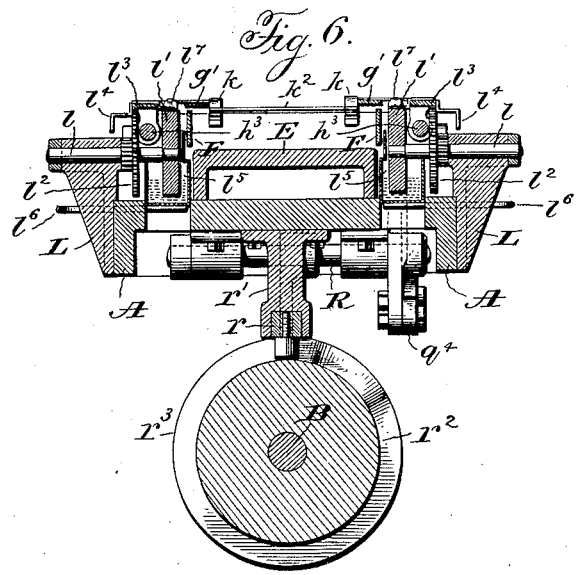
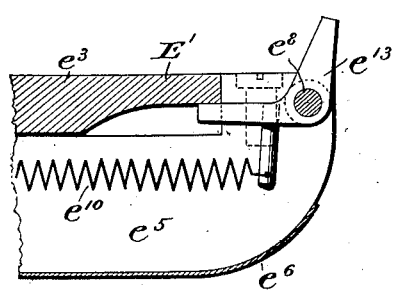
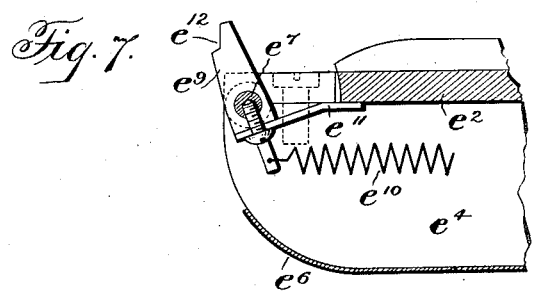
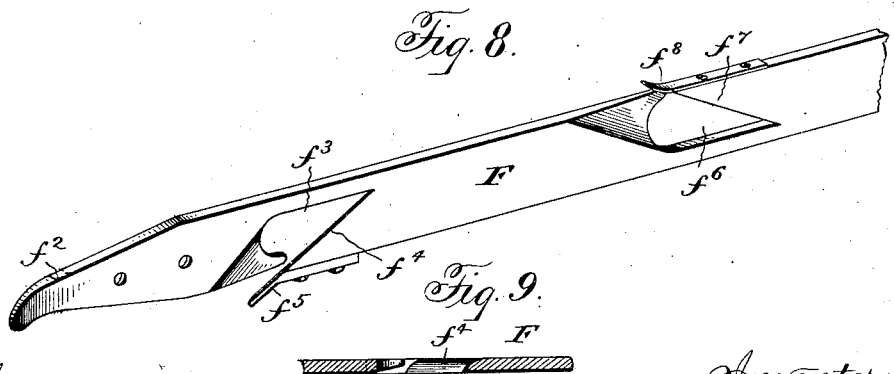
Witnesses:
Jas. E. Hutchinson
Henry C. Hazard
Inventor.
Jacob P. Wright,
by Edwin J. Prindle,
his Atty.

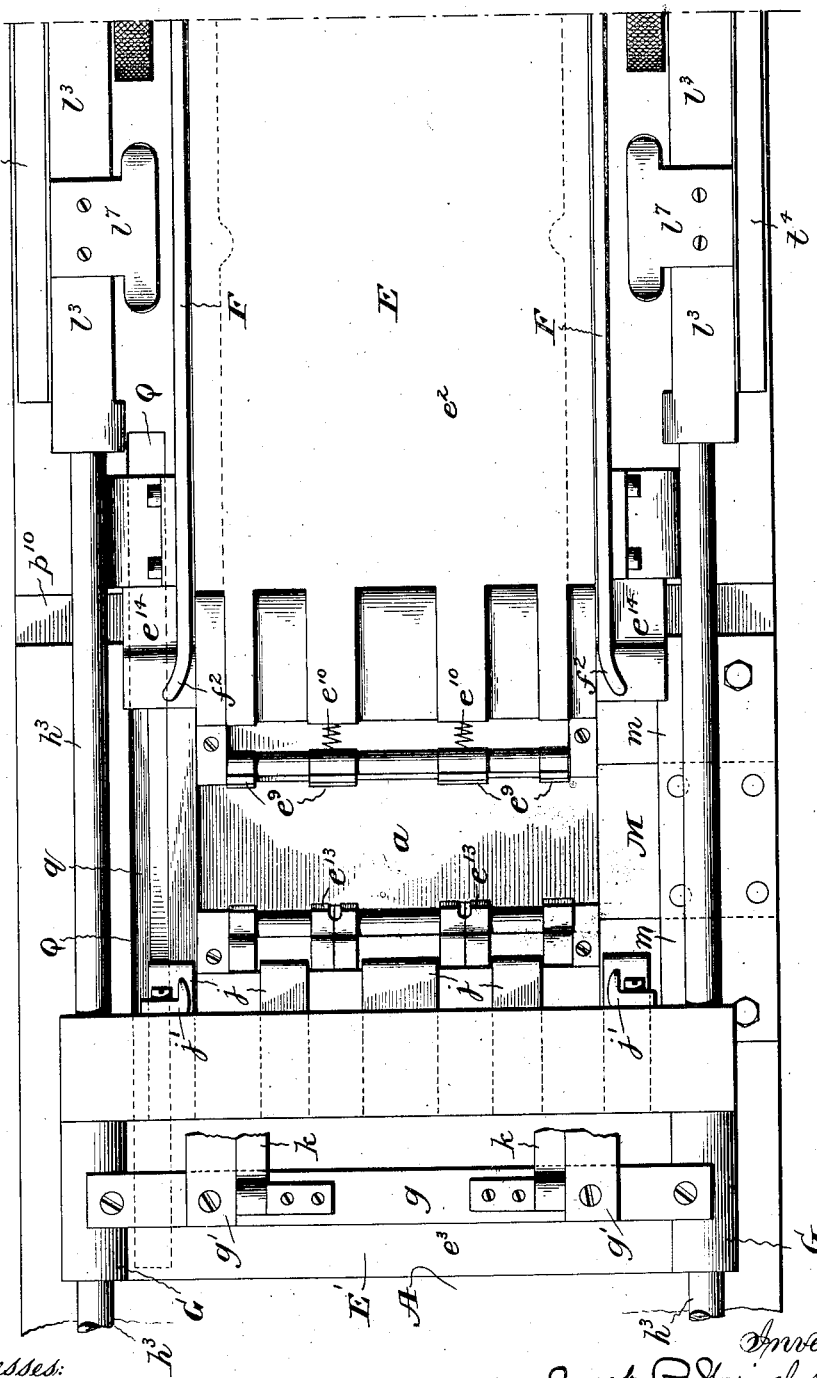

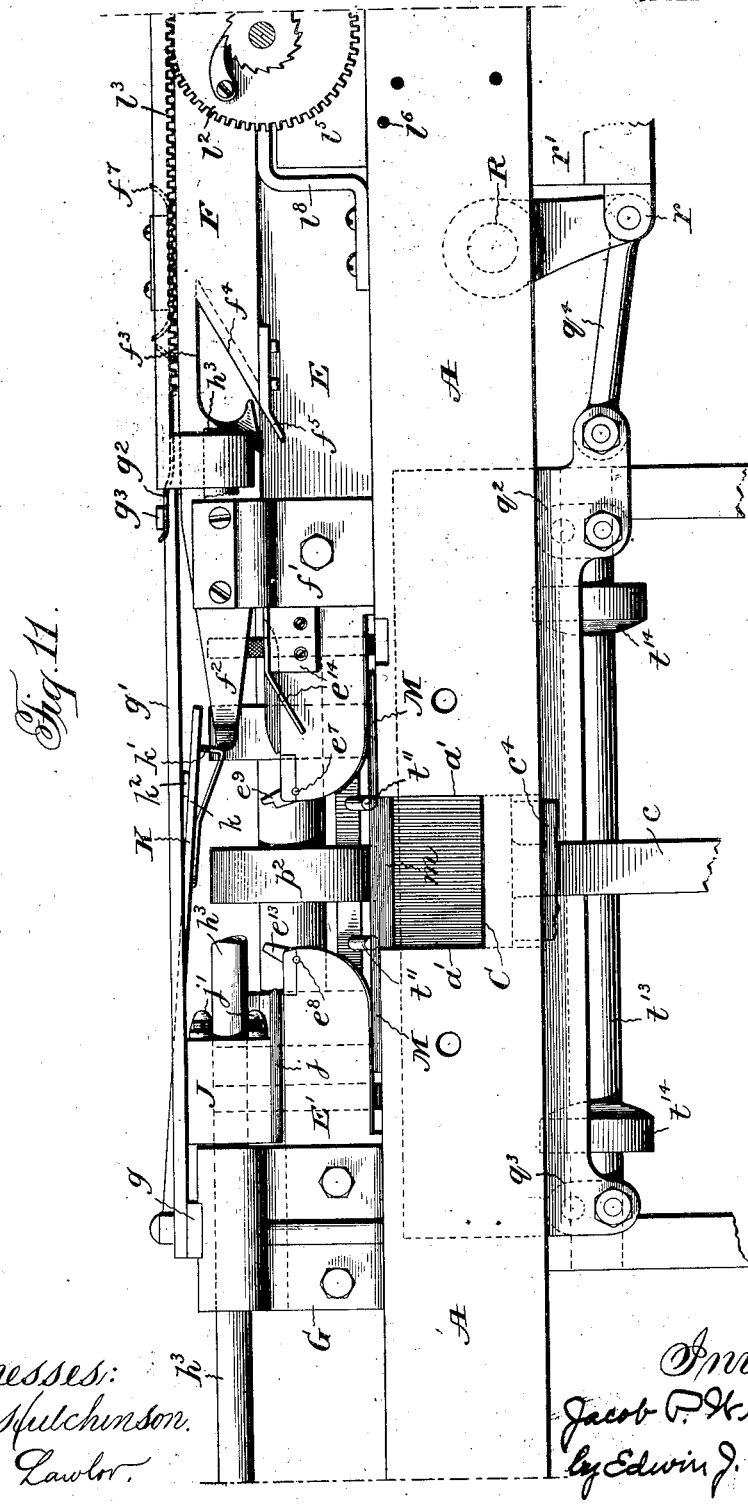

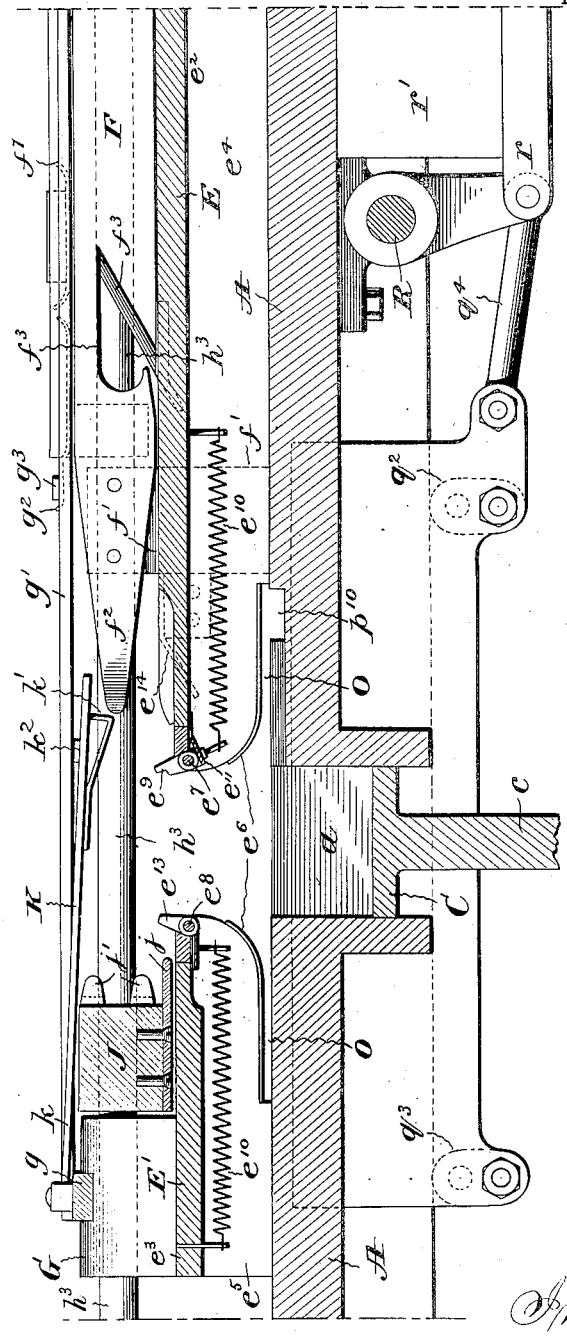

No. 836,728. PATENTED NOV. 27, 1906.
J. P. WRIGHT.
WRAPPING MACHINE.
APPLICATION FILED NOV. 25, 1901.
12 SHEETS—SHEET 10.
Fig. 13.  Fig. 14.
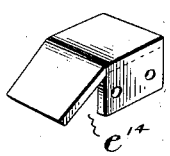
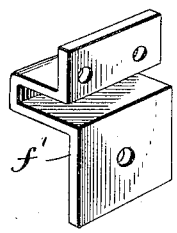
Fig. 15.
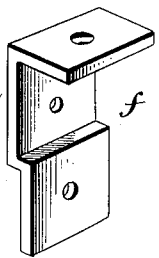
Fig. 16.
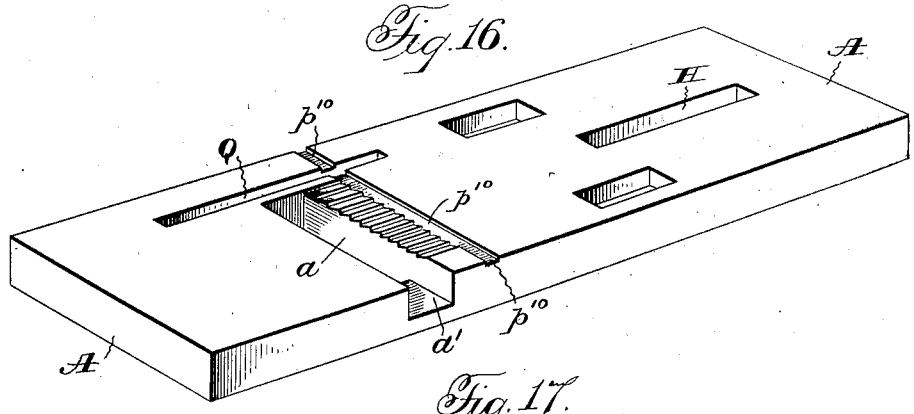
Fig. 17.
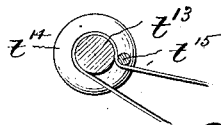
Witnesses:
Jas E. Hutchinson
J. L. Lawlor
Inventor.
Jacob P. Wright,
by Edwin J. Prindle,
Atty.

No. 836,728. PATENTED NOV. 27, 1906.
J. P. WRIGHT.
WRAPPING MACHINE.
APPLICATION FILED NOV. 25, 1901.

12 SHEETS—SHEET 11.

Witnesses:
Jas. E. Hutchinson
Henry C. Hazard

Inventor.
Jacob P. Wright,
by Edwin J. Prindle,
his Atty.

No. 836,728. PATENTED NOV. 27, 1906.
J. P. WRIGHT.
WRAPPING MACHINE.
APPLICATION FILED NOV. 25, 1901.

12 SHEETS—SHEET 12.

Witnesses:
Jas. E. Hutchinson
Henry C. Hazard

Inventor.
Jacob P. Wright,
by Edwin J. Prindle, his Atty

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

WRAPPING-MACHINE.

No. 836,728.　　　　Specification of Letters Patent.　　　　Patented Nov. 27, 1906.

Application filed November 25, 1901. Serial No. 83,617.

*To all whom it may concern:*

Be it known that I, JACOB P. WRIGHT, of Akron, in the county of Summit and in the State of Ohio, have invented certain new and useful Improvements in Wrapping-Machines; and I do hereby declare that the following is a full, clear, and exact description thereof, reference being had to the accompanying drawings, in which—

Figure 1:
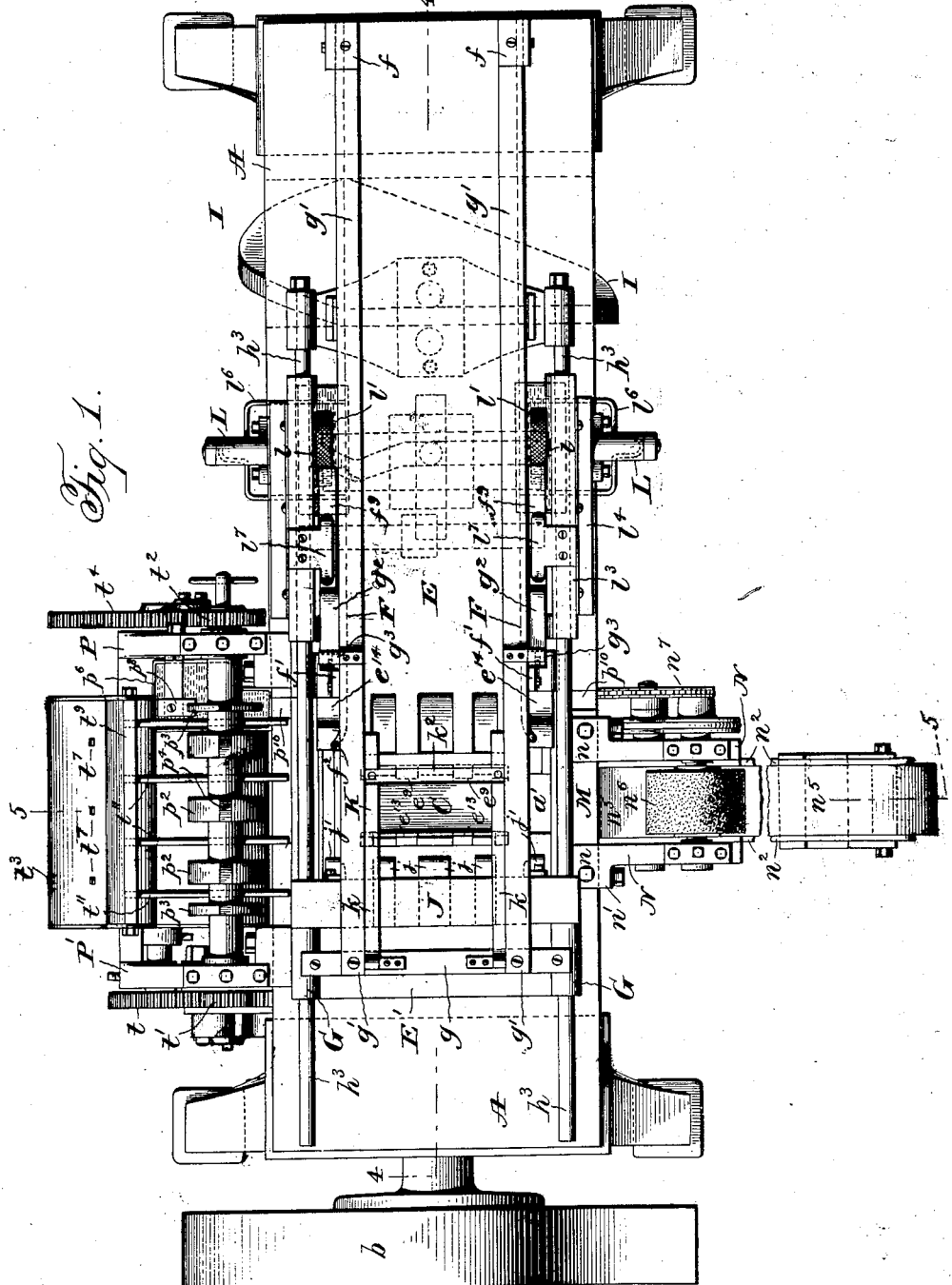
Figure 2:
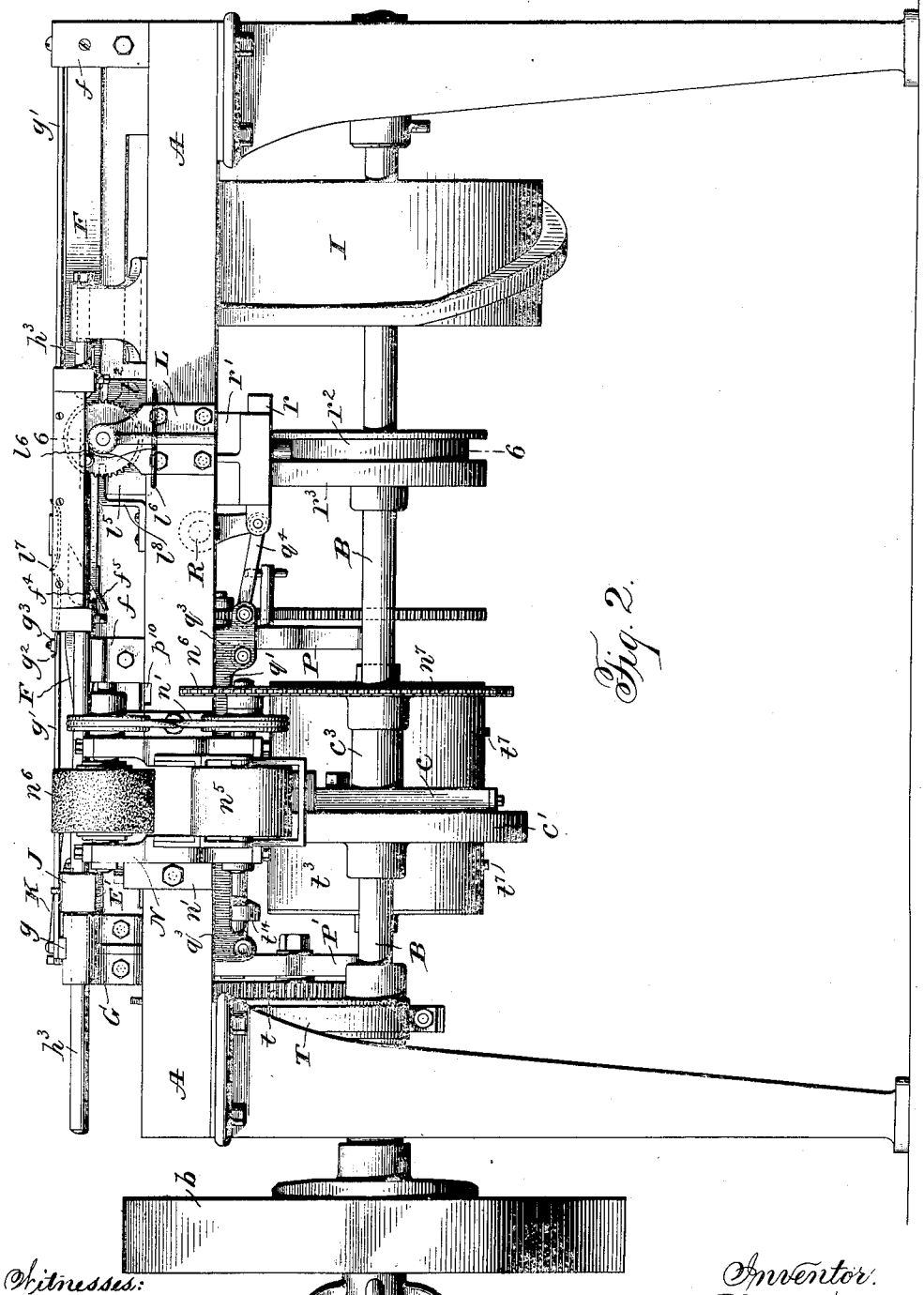
Figure 3:
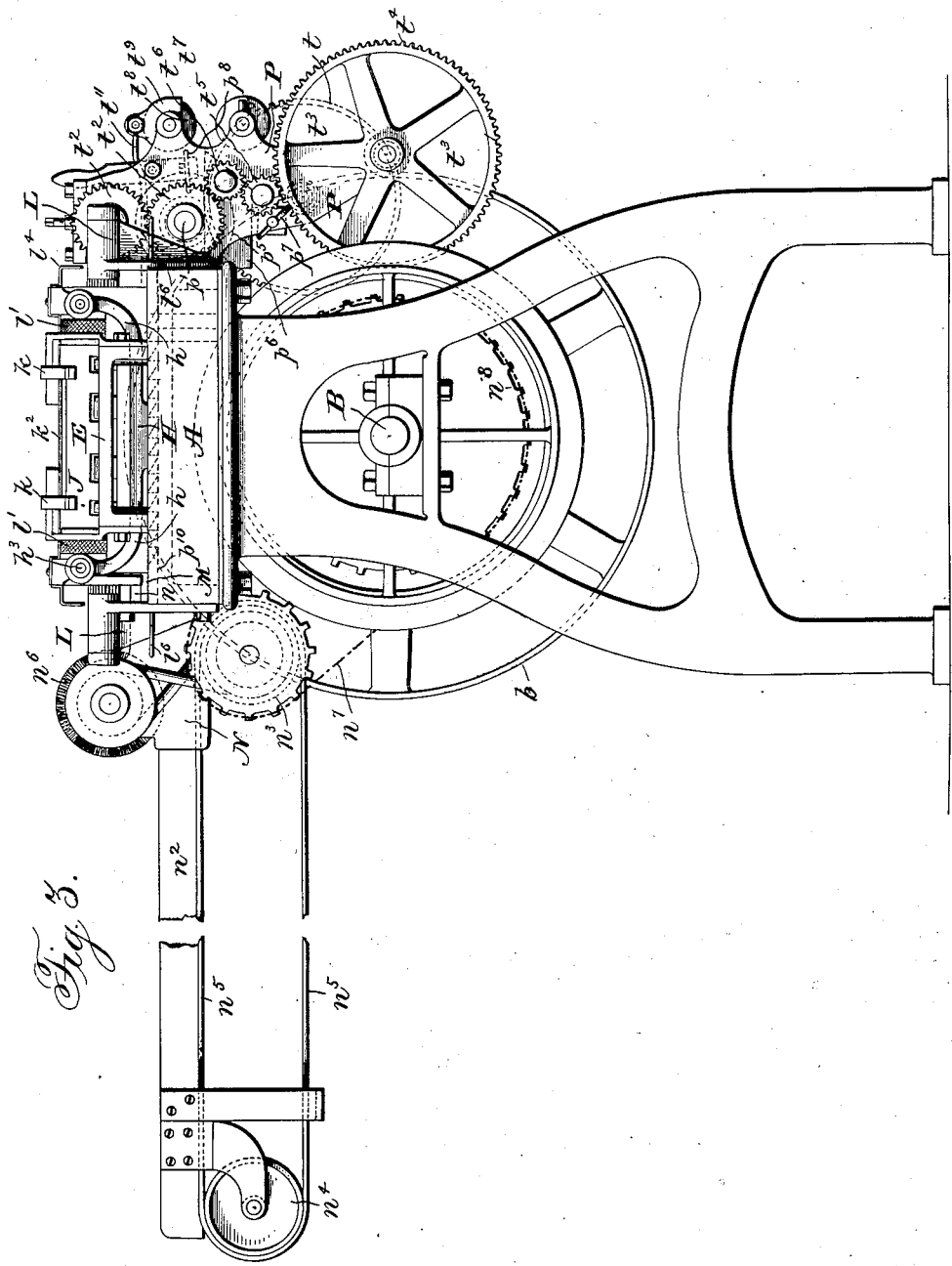
Figure 4:
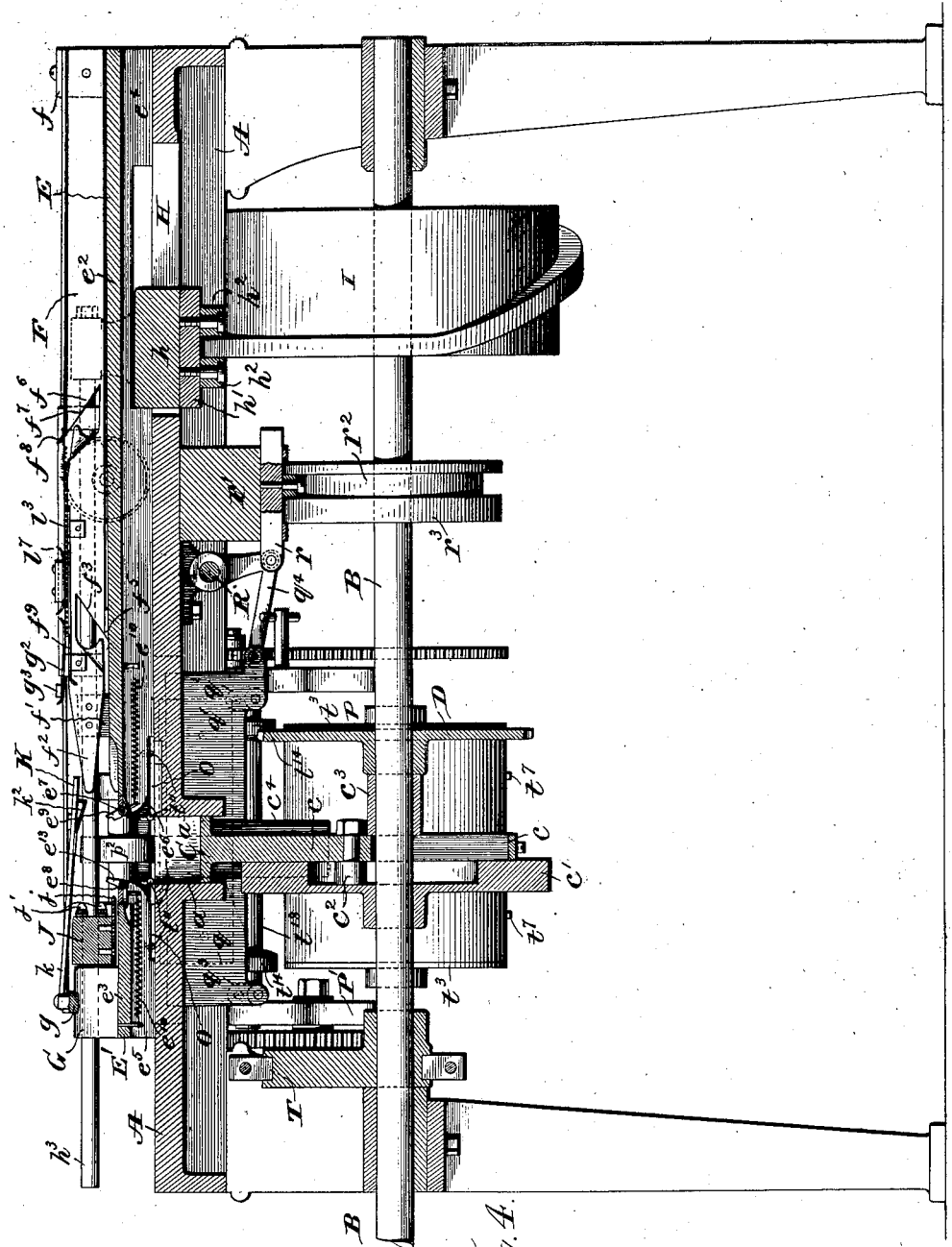
Figure 5:
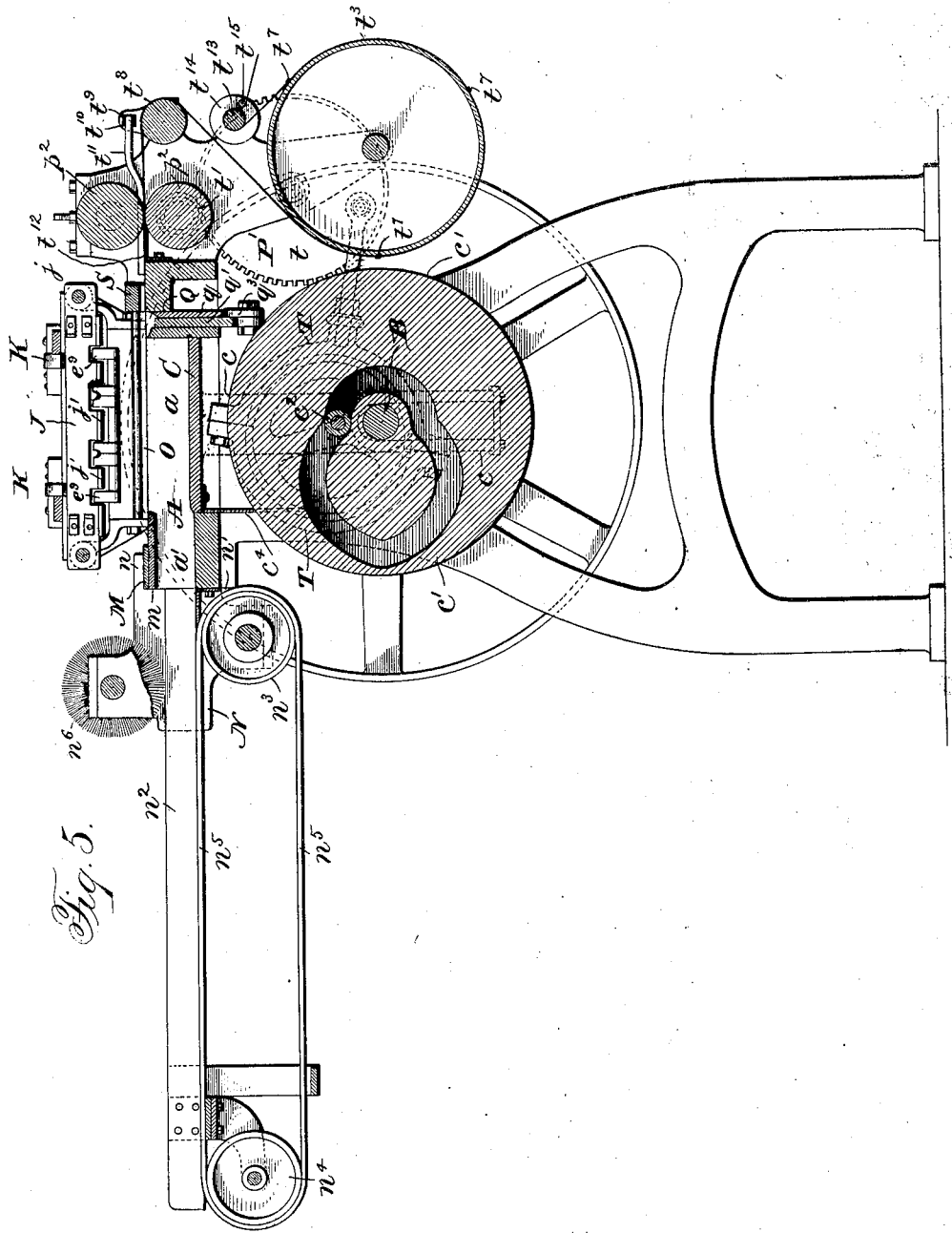
Figure 18:
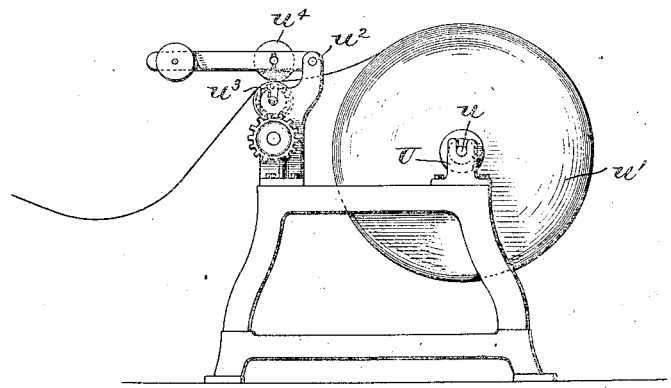
Figure 19:
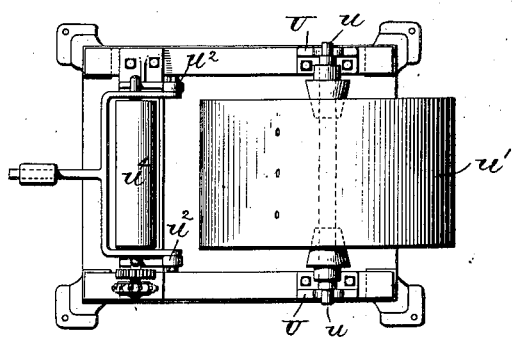

Figure 1 is a plan view of a machine embodying my invention. Fig. 2 is a side elevation; Fig. 3, an end elevation of the machine illustrated in Fig. 1. Figs. 4 and 5 are respectively longitudinal and transverse vertical cross-sections of such machine, taken on the lines 4 4 and 5 5 of Fig. 1, respectively. Fig. 6 is a partial transverse sectional view of the machine illustrated in the preceding figures, the section being taken on the line 6 6 of Fig. 2. Figs. 7, 8, and 9 are views of details of the machine of the preceding figures; Fig. 10, a detail top plan view, on a larger scale, of the package-wrapping mechanism; Fig. 11, a view of the same on the same scale in side elevation; Fig. 12, a view on the like scale of said mechanism in longitudinal section. Figs. 13, 14, and 15 are detail views in perspective of certain minor parts of the machine; Fig. 16, a detail perspective view of the bed of the machine; Fig. 17, a detail view in section of the wrapper-feed-controlling device. Figs. 18 and 19 are views of the means for feeding the wrapping material from a roll of the latter, and Figs. 20 to 26 are perspective views illustrating the various steps in the operation of wrapping a package as performed in the machine illustrated in the preceding figures.

Letters of like name and kind refer to like parts in each of the figures.

My invention relates to machines for wrapping articles and packages; and its objects have been to provide a machine that, while especially adapted to wrap packages or groups of match-boxes, shall also be capable of wrapping other articles or packages and that shall have among other advantages any or all of those of being automatic and rapid in its action, of forming perfect packages, of so placing the wrapper on the package that printed matter shall be accurately situated in the desired position on the finished package, of correctly and accurately forming the folds in the wrapper, and of securing the wrapper by the use of adhesive material; and to such ends my invention consists in the wrapping-machine hereinafter specified.

Figure 20:
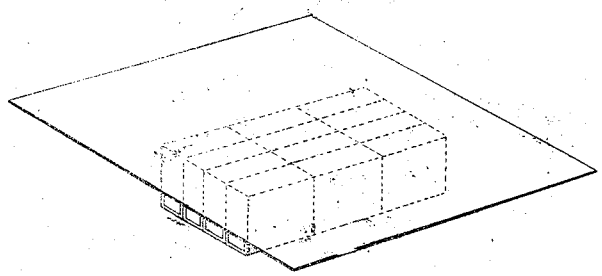
Figure 21:
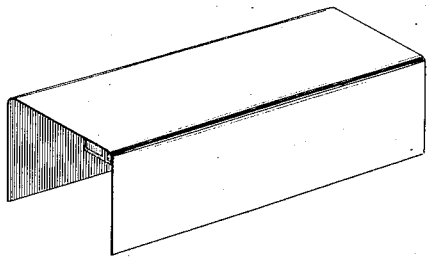
Figure 22:
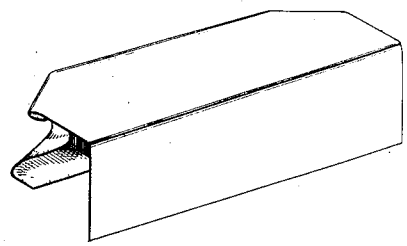
Figure 23:
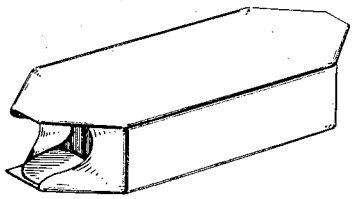
Figure 24:
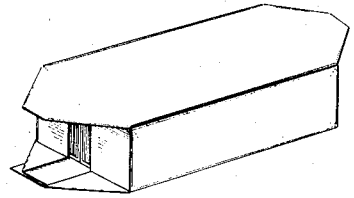
Figure 25:
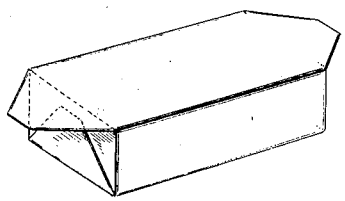
Figure 26:
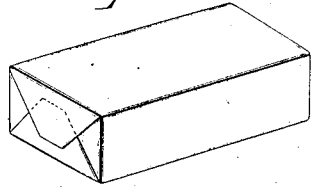

In general the steps in the operation of wrapping a package which are performed by the machine embodying my invention are as illustrated in Figs. 20 to 26, inclusive. In performing such operation the articles which are to be wrapped are fed in from one side of the machine in a group, as indicated in Fig. 20. The wrapper to be used is fed in above or below such group, (in the instance chosen the wrapper being above the group of articles,) such wrapper being preferably cut off from a roll of sheet material. The group of articles is then thrust upward against the wrapper, which latter is forced between two parallel walls that are separated by a distance substantially equal to the horizontal width of the group of objects. This condition is represented in Fig. 21. One side of the wrapper is then folded against the under side of the group of articles, as indicated in Fig. 22. The opposite side of the wrapper is then folded against the under side of the package and overlaps the first-mentioned side of the wrapper, to which it is secured by adhesive material which has previously been placed upon the last-mentioned side of the wrapper. At the same time that the first side of the wrapper is folded the wrapper is folded against the adjacent vertical edges of the package, thus beginning the formation of the upper and lower end flaps of the wrapper. As the second side of the wrapper is folded against the under side of the package the wrapper is folded about the adjacent vertical edges of the package, thus partially defining the end flaps of the wrapper, as shown in Fig. 23. The upper and lower end flaps of the wrapper are then pressed to sharply fold the wrapper, as shown in Fig. 24. The lower flaps are then folded up against the ends of the package, as shown in Fig. 25. The upper flaps are provided with adhesive material on their under sides and are then folded over the lower flaps and secured thereto, as shown in Fig. 26.

In carrying my invention into practice I provide a rectangular bed A, which is supported by leg-frames that are bolted to the under side of the bed, at the ends thereof. A driving-shaft B is mounted in bearings that are secured to the leg-frames, and such shaft extends longitudinally beneath the center line of the bed. A transverse rectangular opening $a$ is formed in the bed, near the forward end thereof, such end being the left-hand end, as seen in Fig. 2. Within the opening $a$ a rectangular plunger C is situated, and such plunger has a vertical stem $c$, whose lower end is slotted or forked and straddles the driving-shaft. The lower end of the slot in the stem is closed below the shaft by a cross-bar. The plunger is raised and lowered by a box-cam $c'$, which is formed in a side of a disk that is mounted on the driving-shaft. The cam engages and moves the plunger-stem through the medium of a roller $c^2$, that is mounted on a stud on the said stem. The plunger-stem is held against the cam-disk by a sleeve $c^3$, which is mounted on the driving-shaft between the said stem and a sprocket-wheel D, which latter is fixed on the said shaft.

A passage-way $a'$ for the introduction of the match-boxes or other articles to be wrapped is formed in the top of the bed and extends from the outer face thereof to and connects with the opening $a$. The upper face of the plunger in its lowest position is at the level of the bottom of the passage-way. On the end of the plunger next to the passage-way an apron $c^4$ is secured by a flange or bent portion that is fastened to the under side of the plunger-head. The face of the apron hangs flush with the said end of the plunger, and the apron thus closes the passage-way when the plunger is raised.

A package-trough is constructed on the bed, the base of the trough being formed by long and short sections E and E', respectively, which sections are flush with the sides of the opening $a$, the long section, as seen in Fig. 2, being on the right side of such opening and the short section on the left side thereof. The said bottom sections preferably consist of horizontal plate-like portions $e^2$ and $e^3$, respectively, supported by vertical sides $e^4$ and $e^5$, respectively, which latter are secured to the bed. The lower corners of the sides $e^4$ and $e^5$ at the ends of the bottom sections next the opening $a$ are rounded and are cut back horizontally for a distance from such rounded portions at a level a short distance above the bed of the table. A plate $e^6$, preferably of sheet metal, is secured from side to side on each of the sides $e^4$ and $e^5$ along the lower portions of such rounded corners and along the said horizontal portions. In the upper corners of the sections E and E', are formed half-bearings, in which shafts $e^7$ and $e^8$ are respectively journaled, a shaft thus being located on each of the long sides of the opening $a$. The shafts are retained in their bearings by caps which are screwed to the sections E and E'. Upon the shaft $e^7$ are mounted package-holding fingers $e^9$ and $e^9$, which are fixed on the shaft by screws passing through their hubs and preferably threaded into the shaft.

There are preferably four fingers $e^9$, two fingers being next the sides $e^4$ and two fingers being placed intermediate the ends of the shaft opposite points where the ends of the match-boxes come against each other; but the number of fingers can be varied as desired to adapt the machine to the package to be formed. The intermediate fingers are preferably, although not necessarily, double the width of the end fingers, and the various fingers are kept properly spaced apart by sleeves which are placed between them on the shaft. The fastening-screws of the intermediate fingers are preferably made sufficiently long to serve as levers, to which springs $e^{10}$ and $e^{10}$ are attached, the opposite ends of the springs being attached to pins in the portion $e^2$ of the section E. The shafts are thus given a tendency to turn the fingers toward the boxes to be wrapped, which movement is limited by stops in the form of plates or arms $e^{11}$ and $e^{11}$, that are secured by the heads of screws which fasten the outer fingers to the shaft, the free ends of the arms coming into contact with the under side of the plate-like portion $e^2$. A shoulder $e^{12}$ is formed on each finger near its upper end on the side toward the boxes to be operated upon, and the boxes can rest upon and be held by such shoulders.

On the shaft $e^8$ are freely pivoted a series of fingers $e^{13}$ and $e^{13}$, there being preferably one finger opposite each of the shouldered fingers $e^9$ and $e^9$. The fingers $e^{13}$ and $e^{13}$ are kept properly positioned on the shaft by sleeves on the latter. Each finger comprises an upwardly-extending part having its corner nearest the end of a box cut away, so as to prevent its catching on the box next to the one it is intended to operate upon, a hub, and a rearwardly-extending part which is adapted to strike against the lower side of the plate-like portion $e^3$ of the section E', and thus to limit the movement of the fingers in the direction of the boxes. Each rearwardly-extending part of each finger $e^{13}$ has a downwardly-extending pin to which one end of a spring is attached, whose opposite end is attached to a pin on the under side of the plate-like portion $e^3$, and thus each finger independently of the others is normally pressed toward the articles to be packed and serves to hold such articles in contact with the shoulders $e^{12}$ of the opposite fingers. The independent action of the fingers $e^{13}$ adapts them to hold a number of objects of different dimensions in a direction longitudinally of the bed—as, for instance, a number of match-boxes or rows of match-boxes whose thickness is not uniform. On each side of the bottom section E a paper-guide $e^{14}$ is situated, each of such guides consisting of a plate which is upwardly and rearwardly inclined and then extends horizontally and which has an ear by which it is secured to the section E. The said paper-guides serve to guide the body and bottom flaps of the wrapper up upon the section E.

The sides of the package-trough are formed by guides F and F, which are supported on the bottom section E by brackets. The rearward ends of the guides, or the ends farthest from the plunger-opening in the bed, are supported by brackets $f$ and $f$, whose lower ends are bolted to the sides of the section E and which have a vertical portion above such section, which portion is offset away from the said section, and a horizontal portion extending over the said section. The guides are secured to the inner faces of the offset portions of the brackets $f$ and $f$. The forward portions of the guides are supported by brackets $f'$ and $f'$, each of which has its lower end bolted to a side of the section E and above the bottom of the trough has a horizontal return-bend or U-shape portion whose open end extends toward the trough. Above the said return-bend or U-shape portion each bracket extends vertically, and the guides F and F are secured to the inner faces of such vertical portions. The guides F and F are supported by the brackets $f$ and $f'$ a slight distance above the upper face of the section E, so that there is a space between such parts.

Each guide F consists of a strip whose forward end $f^2$ extends nearly to the forward end of section E of the trough-bottom, such end being tapered to a rounded point and being bent outward or away from the interior of the trough. At a point to the rear of its tapered end the guide has formed in it a package-flap folder $f^3$, consisting of a curved surface $f^4$, which is inclined rearward and upward from the lower edge and which is beveled or curved inward. Such surface is continued below the lower edge of the guide proper by means of a block $f^5$, fastened to such lower edge. Forward of the curved flap-folding surface $f^3$ the guide F is cut away, and its lower outer surface is beveled downward and inward to permit the flap to be folded by the flap-folding surface $f^3$. At a point in the rear of the flap-folder $f^3$ a second flap-folder $f^6$ is formed in each guide, the latter flap-folder having a downwardly and rearwardly inclined surface $f^7$, similar to the surface $f^4$ of the former folder, and the guide is cut away and beveled in front of the surface $f^7$ as in front of the surface $f^4$. On the upper edge of the guide a strip $f^8$ is secured, so as to form substantially a continuation of the surface $f^7$, such strip having its rearward end curved away from the guide to catch and direct the package-flap against the said surface. A guide $f^9$ for the under side of the upper package-flap is secured on the outer face of each guide F, each of such flap-guides consisting of a strip of sheet metal secured to its guide F by means of ears formed thereon, the forward end of the strip being curved downward.

A pair of brackets G and G is secured to opposite sides of the forward end of the trough-bottom section E', and a bar $g$ is secured to such brackets and extends across the bed. Two top rails $g'$ and $g'$ of the trough extend over and longitudinally of the trough, and they are secured at their forward ends to the bar $g$ and at their rearward ends to the horizontal portions of the brackets $f$ and $f$. Top guides $g^2$ and $g^2$ for the upper sides of the top flaps are secured to each top rail, on the outer side thereof, by means of plates $g^3$ and $g^3$, each of which is secured to one of such top rails to which is secured one of the said guides. The guides $g^2$ and $g^2$ consist of strips of sheet metal extending over and parallel with the guides $f^9$ and $f^9$, the extremities of the guides $g^2$ and $g^2$ preferably being slightly curved upward and such guides having a general inclination downward toward the guides $f^9$ and $f^9$.

Near the rearward end of the bed a central longitudinal slot H is formed, and a guide-rod slide $h$ is mounted on the bed over such slot and has a rib which extends into the same. A plate $h'$ is secured to the said rib on the under side of the bed, and thus serves to fasten the slide to the bed. On the plate $h'$ are mounted two antifriction-rollers $h^2$ and $h^2$, which are secured thereto by screws that are threaded into the said plate and which have cylindrical shanks upon which the rollers can turn. A cam I is keyed on the driving-shaft, such cam consisting of a cylindrical body having a cam-rib on its periphery, the rib being received between the rollers $h^2$ and $h^2$ and through them moving the slide. The slide $h$ is provided with two arms which extend outwardly through slots in the sides of the longer trough-bottom section E and which then extend upwardly and terminate in cylindrical bosses in which are secured slide-rods $h^3$ and $h^3$. The said slide-rods extend forwardly and pass through bearings formed in the brackets G and G. At points on the slide-bars rearward of the said brackets a feed and folder bar J is secured to such bars and reciprocates therewith. The under surface of the folder-bar is slightly above the trough-bottom sections, and four horizontal slots are formed in its lower portion to permit the said bar to pass over the package-holding fingers $e^9$ and $e^{13}$. On the under surface of the bar J between and beyond the slotted portions are fastened five bottom folders $j$ and $j$, each of which consists of a plate having an end which projects rearward a considerable distance beyond the rear face of the folder-bar, which end is preferably rounded. The number of such folders can be varied as desired. The trough-bottom section E is slotted or recessed on its upper surface to receive the folders $j$ and $j$ in their rearward positions. Upon the rear face of the folder-bar J two series of end folders $j'$ and $j'$ are fastened. Each of such folders consists of a base, by which it is secured to the folder-bar, and of a rearwardly-projecting and tapering plate rising therefrom, the vertical inner face of such plate being substantially in the plane of the inner face of the corresponding guide F. There are preferably two folders $j'$ and $j'$ upon each end of the bar J, such folders being respectively above and below the end of the corresponding guide F, so that the latter can be received between them.

In order to hold the package from springing back after the feed and folder bar J has carried it rearward, a package-holdback K is provided. The said holdback preferably consists of two parallel bars $k$ and $k$, that are provided with eyes at their forward ends and each of which has a forwardly-beveled shoulder $k'$ and $k'$ near but at a distance forward of its rear end. The bars $k$ and $k$ are connected by a cross-bar $k^2$ and are mounted by means of their eyes on trunnions that are secured to the cross-bar $g$ on the brackets G and G. The beveled shoulders are so positioned that they can drop behind the package when it has been forced rearward by the feed and folder bar J, the rear end of the bars $k$ and $k$ at the same time resting on the top of the package and preventing the bars themselves from falling below the level of the top of the package.

At points horizontally between the upper and lower flap-folders of the side guides F and F brackets L and L are secured to the sides of the bed, there being one bracket on each side. Shafts $l$ and $l$ are mounted horizontally in the said brackets and project toward and transversely to the trough. On the inner ends of each of the said shafts a glue-wheel $l'$ is fixed, each of such wheels being close to the adjacent side guide of the trough and having the upper portion of its periphery situated just below the plane of the under surface of the top flap of the package, so that such flap shall come into contact with the wheel in passing through the trough. Each glue-wheel is turned by a pawl and ratchet, the ratchet-wheel and glue-wheel being fixed on the shaft and the pawl being carried by a gear $l^2$, that is loose on the shaft. Collars are secured on the ends of the shafts outside the brackets, thus preventing inward motion of the shafts. Each gear $l^2$ is driven by a rack $l^3$, the latter being supported on the slide-rods $h^3$ and $h^3$ by means of bosses through which the slide-rods pass. Each rack has a shield $l^4$, fastened to its outer side, and such shields have horizontal portions which extend over the pawls and ratchets, and from the outer edge of the said horizontal portions depend vertical portions which guard the pawls and ratchets from the side.

Pans $l^5$ and $l^5$ for glue or other adhesive material in which the glue-wheels turn are supported in slots or openings in the bed by wire frames $l^6$ and $l^6$, having parallel pins which pass through horizontal holes in the bed and extend across the said slots or openings. Each frame $l^6$ is provided with an outwardly-extending loop which serves as a handle and enables the frame to straddle the rib of the bracket L. When the frames $l^6$ and $l^6$ are drawn outward beyond the slots, the glue-pans can be withdrawn by being lowered through the slots. Each glue-pan has a vertical guard-plate on the side toward its respective guide F to protect the latter from glue. Each rack carries a pressure-plate $l^7$, which extends over the upper flap of the package and serves to press the said flap against the glue-wheel as the package is forced rearward. The gear-wheel and the glue-wheel are of the same diameter, so that the latter has only a rolling contact with the flap, and thereby most effectively and evenly applies glue thereto. A scraper $l^8$ is provided for each glue-wheel, each of which scrapers consists of a forked plate that is secured to and rises from the bed, and each glue-wheel is received in the forked end of its scraper.

A plate M is so secured to the bed that it spans the passage-way $a'$ therein by which the boxes enter the space over the plunger, and a plate $m$ is secured to the under side of the plate M and extends longitudinally of such passage-way from the side of the bed to a point directly over the nearest edge of the plunger. The plate $m$ serves as a cover to the box passage-way $a'$, and its inner lower edge $m'$ is beveled, so that it tends to push the last row of boxes completely over the plunger as the plunger rises in case such row has not been fully advanced by the feeding mechanism. The adjacent upper edge $c^4$ of the plunger is likewise beveled, so as to push back the front row of boxes remaining in the box passage-way $a'$ during such movement in case such row has been advanced so far as to be in the path of the plunger.

A pair of brackets N and N is secured to the side of the bed on opposite sides of the passage-way $a'$, each of which brackets has an ear $n$, which fits over the plate M, and that is secured to the bed by a bolt passing both through the said ear and the plate. A flange $n'$ on each bracket projects laterally therefrom and lies against the side of the bed to which it is secured. Each bracket supports upper and lower bearings and has formed in its face that is opposite the other bracket a horizontal slot in which is secured a bar $n^2$, that projects away from the bed and serves as a side of a box-feed trough. A shaft is mounted in the lower bearings that are supported by brackets N and N, and a belt-pulley $n^3$ is mounted on and turns with such shaft.

A similar belt-pulley $n^4$ is mounted in bearings that are secured to a U-shaped strap which connects the bars $n^2$ and $n^2$ near their outer ends. A carrier-belt $n^5$ runs on the pulleys $n^3$ and $n^4$ and serves to convey boxes to be wrapped into the machine. A belt-guide in the form of a U-shaped trap hangs from the side bars $n^2$ and $n^2$ close to each side of the belt. A brush-wheel $n^6$ of any desired construction is mounted on a shaft that turns in the upper bearings of the brackets N and N, which wheel is in contact with the upper side of and helps advance the rows of boxes. The pulley $n^3$ is driven by a sprocket-chain $n^7$, which runs over a sprocket-gear $n^8$ on the driving-shaft and also over sprocket-gear on the shaft of the said belt-pulley. The brush-wheel is driven by a crossed belt running over pulleys on the shafts of the brush-wheel and the pulley $n^3$.

By the construction of the trough-bottom sections and bed a passage-way O is formed for the reception of the wrapper, such passage-way having for its bottom the portions of the bed upon each side of the opening $a$ and beneath the plates $e^6$ and $e^6$. The passage is closed upon the side from which the articles to be wrapped enter by the adjacent vertical face of the plate M. On the opposite side of the bed and upon opposite sides of the passage O brackets P and P' are secured to the bed, on which brackets are supported the devices which feed the wrapper into the passage O. In the side of the bed where are the brackets P and P' is a longitudinally-extending slot Q, in which a knife $q$ is adapted to be reciprocated vertically to sever the wrapper from the strip of material of which it is formed. The knife is bolted to a knife-slide $q'$, which latter is supported by two links $q^2$ and $q^3$, that are pivoted to the bed and to such slide. The knife-slide has an ear to which is pivoted a link $q^4$, whose opposite end is connected with an arm on a rock-shaft R, that extends transversely of the bed and is journaled in bearings secured to the under side of the latter. Near the center of the bed the said rock-shaft has a second rock-arm, that is pivoted to a slide $r$, which latter is mounted in a slideway formed on a block $r'$, that is secured to the under side of the bed. The slide $r$ has an antifriction-roller secured to its under side, as by a screw passing through the roll and threaded into the slide, which roll is received in a cam-groove $r^2$, formed in the face of a cylindrical cam-body $r^3$, that is fixed upon the driving-shaft. A support S, against which the knife cuts, extends across the wrapper passage-way and is supported slightly above the bed, as by filling-pieces placed thereunder, the inner face of such support being in the line of movement of the knife-edge. The edge of the knife-opening in the bed opposite to the knife is beveled so that the wrapper will not catch at such point. Upper and lower shafts $p$ and $p'$ are mounted in bearings in the brackets P and P', and each shaft is preferably provided with a series of feed-rolls $p^2$ and $p^3$, although a single feed-roll can be mounted upon each shaft, such roll extending the length of the series. The periphery of each feed-roll of one series, preferably the series of the upper shaft, is provided with a flattened portion $p^4$, the flattened portions of the rolls being in line with each other. If desired, the rolls of both series can be flattened, as above described. The circumference of the feed-rolls is slightly greater that the length of the wrapper to be used.

Upon the lower shaft a glue-wheel $p^5$ is mounted, and a glue-pan $p^6$ is secured to the bracket, so that the lower portion of the glue-wheel is received therein. Such glue-pan is preferably provided with a downwardly-extending ear which is adapted to be engaged by a hand-screw $p^7$, that passes through the bracket and engages a threaded hole in the ear. A scraper $p^8$ is screwed to an arm extending horizontally from a vertical lever that is fulcrumed on the bracket P, and such scraper straddles the glue-wheel, so as not only to regulate the depth of glue upon the periphery, but to scrape the sides of the glue-wheel. A groove $p^{10}$ is formed in the wrapper-passage in line with the glue-wheel, so that the glued portion of the wrapper does not touch the bed in entering such passage. Between the said groove and opening $a$ a series of grooves are formed longitudinally in the bed, so that the wrapper is supported at such place only along narrow lines, and interference with the adhesive material on the wrapper when the glued portion of the latter is drawn over the bed during the upward movement of the plunger is reduced to a minimum. In order that the wrapper may not catch upon the last-mentioned grooves, their walls on the sides away from the wrapper-feed rolls are inclined in the direction in which the wrapper moves in entering. An eccentric T is mounted upon the driving-shaft, the connecting-rod of which eccentric is pivoted to a gear $t$, that is journaled on a stud on the bracket P'. The movement of the eccentric causes oscillation of the gear through a part only of a circle, and such gear is, in effect, a segment, and a segment can be substituted therefor, if desired. The gear $t$ meshes with a pinion $t'$, loosely mounted on the lower wrapper-feed shaft, which pinion carries a pawl that engages a ratchet-wheel which is fixed upon the said shaft on the forward end thereof. On the rearward ends of the upper and lower wrapper-feed shafts are fixed intermeshing gears $t^2$ and $t^2$. A wrapper-registering cylinder $t^3$ is mounted upon a shaft that is journaled in the brackets P and P', and motion is communicated to the shaft of such cylinder by a gear $t^4$, fixed on such shaft, which latter is engaged by the lower of two idler-pinions $t^5$ and $t^6$, the upper one of which engages the lower gear $t^2$ on the lower wrapper-feed shaft. The registering-cylinder $t^3$ is provided with a series of pins or rows of pins $t^7$ upon its surface, which pins or rows of pins are spaced apart on the periphery of the cylinder transversely to the axis thereof a distance equal to the length of the wrapper to be used. The wrapper is provided with slots which the pins $t^7$ and $t^7$ can enter, and the wrapper is properly positioned upon the registering-cylinder by engagement of the pins with the forward sides of the said slots. A wrapper idler-roller $t^8$ is mounted in bearings in the brackets P and P', parallel to but outside of the feed-rolls, the upper portion of its periphery being preferably substantially in the plane of meeting of the two feed-rolls. A pair of yokes $t^9$ and $t^9$ straddle the shaft of the roller $t^8$ and are provided with ears that are connected by a bar $t^{10}$, in which bar are secured the outer ends of wrapper-guide fingers $t^{11}$ and $t^{11}$. The latter consist of rods which extend in the direction of movement of the wrapper between the wrapper-feed rolls and which have their outer ends supported upon the upper surface of the bed. A bridge $t^{12}$, consisting of a metal plate having one edge bent at an angle to the plate to secure it to the side of the bed, extends from the edge of the bed to the wrapper-feed rolls to carry the wrapper from said rolls over upon the bed. A wrapper-tension rod $t^{13}$ is fixedly secured in holes in the brackets P and P', and collars $t^{14}$ and $t^{14}$ are secured upon such rod adjacent to the inner faces of the said brackets, the adjacent faces of which collars are made conical, so as to properly position the wrapper longitudinally of the rod. The said collars have secured in holes therein a wrapper brake-rod $t^{15}$, the position of which relative to the path of the wrapper can be altered by turning the rod $t^{13}$ in its bearing.

The wrapper is preferably fed to the wrapping-machine so that there is a slack portion between the brake-rod and the source of supply of the wrapper. For such purpose I provide, as illustrated in Figs. 18 and 19, a frame which is situated upon the same side of my machine as the wrapper-feed mechanism and in line therewith, which frame is provided at its end farthest from the wrapping-machine with brackets U and U, having open bearings in which a shaft $u$ can be seated. The shaft $u$ is adapted to support the roll $u'$ of wrapping material and may be formed in any convenient manner. Preferably it is provided with oppositely-positioned cones, which are adapted to be forced into and snugly fit the opening in the roll $u'$. On the end of the frame adjacent the wrapping-machine a pair of brackets $u^2$ and $u^2$ are secured, and such brackets are provided with open bearings in which are received the ends of the shaft of the lower feed-roll $u^3$. An upper feed-roll $u^4$ is mounted in bearings formed in a yoke that is pivoted to ears on the brackets and that has a weight-supporting arm by which the pressure of the upper roll upon the lower roll can be regulated. Upon one end of the shaft of the lower feed-roll a pinion is fixed, and such pinion meshes with a pinion that turns upon a stud on the side of the bracket $u^2$. The latter pinion has secured thereto a sprocket-wheel that is driven by a sprocket-chain from a similar wheel D upon the driving-shaft of the wrapping-machine. The driving-shaft of the wrapping-machine is preferably provided with a loosely-mounted belt-pulley $b$, which can be clutched to its shaft by any convenient form of clutch. The clutch which I prefer is operated by a hand-wheel that is drawn with the belt in starting and that can be made to release the clutch by merely holding such wheel from turning with the shaft.

In the operation of my machine the wrapper is led from the roll of material between the rolls $u^3$ and $u^4$, under the brake-rod $t^{15}$, over the tension-bar $t^{13}$, around and under the registering-cylinder $t^3$, the slots in the wrapper being made to register with the pins $t^7$, over the idler-roll $t^8$, and through the wrapper-feed rolls. The driving-shaft is then set in motion, and the wrapper is advanced by the feed-rolls through the wrapper-passage until it comes in contact with the side of the plate M. In feeding the wrapper the feed-rolls because of their size draw a length slightly greater than the length of the desired wrapper. In thus drawing more than the length of the desired wrapper the feed-rolls through the wrapper-strip carry the registering-cylinder forward slightly beyond what its gearing would drive it, this being permitted by the play in the gearing which practically always exists and being a very small distance. When the flattened places upon the upper feed-roll come opposite the lower feed-roll, the wrapper is momentarily released, and its forward motion is checked. During this period of comparative rest of the wrapper the pins $t^7$ and $t^7$ on the registering-cylinder advance until they come in contact with the forward walls of the slots in the wrapper, when the feed-rolls again take hold of the wrapper-strip and cause it to advance. The tension-rod and brake-rod hold the wrapper material from either advancing or receding at the point where they engage it of its own weight. By the action above described slightly more than the desired length of material is fed forward, and the wrapper-strip is then released, and, its onward movement stopping while the rotation of the registering-roll continues, the registering-pins will be brought into engagement with the forward sides of the slots in the strip, and the feed-rolls then take a new hold upon the wrapper-strip. This operation instead of adding together the unavoidable errors which separate feeding of the wrapper-strip give, and thus producing an error which would render impossible the proper placing of printing material upon the package, causes each operation of feeding to be independent of all the other operations of feeding and to be made with the slots in the wrapper as starting-points, so that accurate feeding of a strip of great length is secured. The fingers $t^{11}$ and $t^{11}$ lie upon the wrapper and yieldingly hold it in contact with the bed-surface, so as to prevent buckling. The feed-rolls can, if desired, be operated continuously instead of intermittently. The use of a series of pins or rows of pins upon the registering-cylinder enables me to feed wrapping material that is much thinner and less substantial than would be the case if but a single pin or row of pins were used. The pins engage the wrapper at more points than would be the case with a single row, and the cylinder being of greater circumference affords a better opportunity for the wrapper to adhere to its surface and to be fed thereby than would be the case of a cylinder adapted to feed but one length of wrapper. As the wrapper passes through the feed-rolls glue is applied thereto by the glue-wheel, and such glued portion of the wrapper passes over the groove in the bed-face and is therefore not injured. The cam $r^3$ then reciprocates the slide $r$ and by means of the rock-shaft, rock-arms, and link causes the knife-slide to swing upon its supporting-links. This movement carries the knife upward across the wrapper-passage and across the face of the supporting-bar, against which it forces the latter and severs the latter.

Boxes of matches are placed upon the carrier-belt and are carried thereby toward the plunger, the brush-wheel both assisting directly to move the boxes and to press them upon the belt carrier to increase the hold of the latter upon the boxes. The boxes advance until they meet the wall of the opposite side of the plunger, when a group of twelve boxes, in three rows of four each, will have been formed over the plunger. The plunger now rises, carrying with it the group of twelve boxes, and closes, by means of its apron, the passage $a'$, and thus prevents the advance of the column of boxes during its movement up and down. The upward movement of the plunger causes the boxes to carry the wrapper with them, the wrapper being drawn out from under the plates $e^6$ and $e^6$ and by contact therewith and with the ends of the sections E and E' being folded against the vertical sides of the group of boxes. The upward movement of the plunger continues until the partially-wrapped package is supported upon the shoulders $e^{12}$ of the fingers $e^9$ and $e^9$, against which fingers it is pressed by the fingers $e^{13}$ and $e^{13}$, each of which latter fingers, independently of the others, acts upon the box which may be nearest to it, so that each row of boxes is firmly held independently of the others, and the longer rows do not prevent the shorter rows from being held with equal security. The feed-bar J is now moved rearward, such movement being performed by the cam I through the slide and feed rods of the feed-bar. As the feed-bar approaches the package its lower folders $j$ and $j$ tuck the portion of the wrapper which extends below the package under the package, after which its folders $j'$ and $j'$ turn the wrapper around the adjacent vertical edges of the package. The feed-bar J then carries the package bodily rearward, the fingers $e^9$ yielding to permit such movement. As the package moves rearward the forward edge of the section E causes the adjacent portion of the wrapper which extends below the package to be turned against its under face and upon the portion which has previously been turned against the under face of the package. The ends $f^2$ of the guides F and F then come into contact with the wrapper and cause it to be folded around the adjacent vertical edges of the package and against the ends thereof. The upper and lower end flaps of the wrapper are thus partially formed. The feed-bar J causes the package to be moved rearward until the shoulders $k'$ and $k'$ of the holdback drop behind the package. The feed-bar is then retracted to its forward position. As the feed-bar moves successive packages rearward the first package is carried rearward through the trough and in so moving the upper end flaps of the package are carried between the guides $f^3$ and the guides $q^2$, and the edges of such flaps are sharply defined by the pressure of the said guides upon opposite sides of the flap. The lower flaps are turned upward by the folding-surfaces $f^3$ and $f^3$ as the package progresses rearward, and the inner surfaces of the guides F and F press such flaps against the ends of the package. During the further progress of the package rearward the pressure-plates $l^7$ and $l^7$ press upon the upper surfaces of the flaps and hold them while they pass over the glue-wheels. Such pressure-plates travel at the same speed as the package, and the peripheries of the glue-wheels also travel at such speed, owing to the action of the racks $l^3$ and $l^3$. After having had glue applied to the end surfaces of the upper flaps such flaps are engaged by the inclined surfaces $f^7$ and $f^7$ and are turned downward over the lower flaps, against which they are held by the inner surfaces of the guides F and F until the glue has set. When the package issues from the rear end of the package-trough, it is completely wrapped.

Various changes can be made in the above-illustrated construction, which changes will be within the scope of my invention, and the above-described machine is merely to be regarded as one embodiment thereof.

Having thus described my invention, what I claim is—

1. In a wrapping-machine, the combination of two parts that are separated a distance substantially equal to one dimension of the package to be wrapped, means for moving an object against a wrapper held across the space between said parts, and forcing such object and wrapper into said space, whereby the wrapper is caused to cover three sides of said object, a trough in a side of which is a plurality of fixed reversely-inclined folders, having inwardly beveled or curved surfaces arranged in different planes transversely of, and at different points along, the trough, and means for progressively advancing the said object, with its wrapper, into and through the trough so that the wrapper engages said folders in succession, substantially as described.

2. In a wrapping-machine, the combination of means for folding a wrapper about an object or objects and forming flaps opposite each other, and a trough having its sides formed each with a plurality of fixed reversely-inclined flap-engaging portions, having inwardly beveled or curved surfaces situated in different planes transversely of the trough and at different points along the same to engage the flaps in succession and fold one after the other, substantially as described.

3. In a wrapping-machine, the combination of means for folding a wrapper about an object or objects and forming flaps opposite each other, a trough comprising side guides having each an end to engage and fold a portion of the wrapper and having also a plurality of fixed reversely-extending flap-engaging surfaces situated in different planes transversely of the trough and at different points along the same to engage the flaps in succession and fold one after the other, and glue-applying means adjacent to the trough, substantially as described.

4. In a wrapping-machine, the combination of means for folding a wrapper about three sides of an object or objects with ends projecting therefrom, a trough comprising parallel sides into and through which the same is passed, each of said sides having an end to engage and fold a portion of the wrapper, a reciprocating device having fingers to tuck in the wrapper at opposite ends and adapted to move the partially-wrapped object or objects into the trough, and a plurality of fixed reversely-extending flap-engaging surfaces in each side of the trough situated at different points along the said trough so as to engage flaps at the ends of the package in succession and fold one after the other, substantially as described.

5. In a wrapping-machine, a package-trough comprising side guides having each a plurality of fixed reversely-inclined flap-engaging devices having inwardly beveled or curved surfaces situated in different planes transversely of the trough and at different points along the trough to successively engage opposing flaps and fold the same one after the other upon the package, substantially as described.

6. In a wrapping-machine, the combination of a package-trough, comprising side guides, having each two flap-engaging devices situated in different planes transversely of the trough and at different points along the trough to successively engage opposing flaps and fold the same one after the other upon the package, and a reciprocating device for moving packages through the trough.

7. In a wrapping-machine, a packing-trough comprising side guides having each an end to engage and fold a portion of the wrapper, and having each two flap-engaging devices situated in different planes transversely of the trough and at different points along the trough to successively engage opposing flaps and fold the same one after the other upon the package, substantially as described.

8. In a wrapping-machine, the combination of a package-trough, comprising side guides having each an end to engage and fold a portion of the wrapper and having each two flap-engaging devices situated in different planes transversely of the trough and at different points along the trough to successively engage opposing flaps and fold the same one after the other upon the package, and means for moving a package into the trough having extensions to engage and fold portions of the wrapper opposite those acted upon by the trough ends, substantially as described.

9. In a wrapping-machine, the combination of a package-trough, having a bottom that forms a flap-folder, and having side guides, having each an end to engage and fold a portion of the wrapper, and having each two flap-engaging devices situated in different planes transversely of the trough, and at different points along the same to successively engage opposing flaps and fold the same one after the other upon the package and means to move a partially-wrapped package into the trough, substantially as described.

10. In a wrapping-machine, the combination of a package-trough having a bottom that forms a flap-folder, and having side guides having each an end to engage and fold a portion of the wrapper, and having each two flap-engaging devices situated in different planes transversely of the trough and at different points along the same to successively engage opposing flaps and fold the same one after the other upon the package, and a feed-bar carrying parts to engage and fold portions of the wrapper, substantially as described.

11. In a wrapping-machine, the combination of two parts that are separated a distance substantially equal to one dimension of the package to be wrapped, thus forming a passage, yielding package-holding fingers at one end of said passage, and a plunger movable through said passage from the end thereof opposite said fingers to deliver the package, partly wrapped, to the latter and means for acting upon the said package and advancing it across the said passage against the pressure of the fingers, substantially as described.

12. In a wrapping-machine, the combination of two parts that are separated a distance substantially equal to one dimension of the package to be wrapped thus forming a passage, the said passage having a flaring entrance, yielding package-holding fingers at one end of such passage opposite such entrance, and a plunger movable into said entrance and through said passage to deliver the package, partly wrapped, to the latter, and means for acting upon the said package and advancing it across the said passage against the pressure of the fingers, substantially as described.

13. In a wrapping-machine, the combination of two parts that are separated a distance substantially equal to one dimension of the package to be wrapped, thus forming a passage, the said passage having a flaring entrance, yielding package-holding fingers at one end of such passage opposite such entrance, a plunger movable into said entrance and through the said passage to deliver the package, partly wrapped, to the latter, and a feeding-bar movable across the said passage at its end opposite the flaring entrance, to act upon the package and force the same onward against the pressure of the fingers, substantially as described.

14. In a wrapping-machine, the combination of two parts that are separated a distance substantially equal to one dimension of the package to be wrapped, thus forming a passage, the said passage having a flaring entrance, yielding package-holding fingers at the end of such passage opposite such entrance, a plunger movable into said entrance and through the said passage, means for supporting a wrapper across the said entrance whereby the package, partly wrapped, is delivered to the fingers, and a feeding-bar movable across the passage at the end thereof opposite said flaring entrance, so as to act upon the package and force the same onward against the pressure of the fingers, substantially as described.

15. In a wrapping-machine, the combination of means for applying a wrapper to the objects to be wrapped, a plunger for carrying the said objects to the said means, a guideway in the plane of the lower position of the plunger-face, a belt in said guideway, and having its surface that is nearest the said objects constantly moving toward said plunger, and an apron on said plunger on the side thereof toward the said guideway, substantially as and for the purpose described.

16. In a wrapping-machine, the combination of means for applying a wrapper to the objects to be wrapped, a plunger for carrying said objects to said means, a guideway in the plane of the lower position of the plunger-face, a belt in said guideway, and a rotary brush also situated therein, the surfaces of said belt and said brush that are nearest said objects being constantly in motion toward the said plunger, and an apron on said plunger on the side thereof toward the said guideway, substantially as and, for the purpose described.

17. In a wrapping-machine, the combination of parts forming a passage through which the object or objects to be wrapped can be passed, means for holding a wrapper across one end of said passage, means for forcing the object or objects against the wrapper and through the passage, a feed and folding bar movable across one end of said passage, tuckers on said bar for folding over one wrapper and one side of the package, and tuckers on said bar for tucking in the wrapper at opposite ends of the package, said first-mentioned tuckers being longer than the others, whereby the wrapper is folded over the side before it is tucked over the ends of the package, substantially as described.

18. In a wrapping-machine, the combination with parts forming a passage through which the object or objects to be wrapped can be passed, said passage having a width substantially equal to one dimension of said object or objects, means for holding a wrapper across the lower end of said passage, means for forcing said objects against said wrapper and through said passage, a feed and folding bar movable across the upper end of said passage, tuckers on said bar for tucking in the adjacent lower edge of the wrapper, and tuckers on said bar for tucking in the wrapper over the adjacent vertical edges of the package, said first-mentioned tuckers being longer than said last-mentioned tuckers, whereby the wrapper is tucked over the adjacent lower edge of the package before it is tucked over the adjacent vertical edges thereof, substantially as and for the purpose described.

19. In a wrapping-machine, the combination with parts forming a passage through which the object or objects to be wrapped can be passed, said passage having a width substantially equal to one dimension of said object or objects, means for holding a wrapper across the lower end of said passage, means for forcing said objects against said wrapper and through said passage, a feed and folding bar movable across the upper end of said passage, tuckers on said bar for tucking in the adjacent lower edge of the wrapper, and tuckers on said bar for tucking in the wrapper over the adjacent vertical edges of the package, said first-mentioned tuckers being longer than said last-mentioned tuckers, whereby the wrapper is tucked over the adjacent lower edge of the package before it is tucked over the adjacent vertical edges thereof, said part toward which the package is moved by the feed and folding bar having a portion of its surface substantially in a plane with the upper surfaces of said first-mentioned tuckers, and being recessed to receive said tuckers, substantially as and for the purpose described.

20. In a wrapping-machine, the combination with parts forming a passage through which the object or objects to be wrapped can be passed, said passage having a width substantially equal to one dimension of said object or objects, means for holding a wrapper across the lower end of said passage, means for forcing said objects against said wrapper and through said passage, package-holding fingers pivoted at the upper end of said passage, said fingers being normally yieldingly held projecting over, but away from said passage, and a feed-bar moved across the upper end of said passage, substantially as described.

21. In a wrapping-machine, the combination with parts forming a passage through which the object or objects to be wrapped can be passed, said passage having a width substantially equal to one dimension of said object or objects, means for holding a wrapper across the lower end of said passage, means for forcing said objects against said wrapper and through said passage, package-holding fingers pivoted at the upper end of said passage, said fingers being normally yieldingly held projecting over, but away from said passage, and a feed-bar moved across the upper end of said passage, said fingers on the side opposite said feed-bar being provided with shoulders upon which the said objects can rest, substantially as described.

22. In a wrapping-machine, the combination with parts forming a passage through which the object or objects to be wrapped can be passed, said passage having a width substantially equal to one dimension of said object or objects, means for holding a wrapper across the lower end of said passage, means for forcing said objects against said wrapper and through said passage, package-holding fingers pivoted at the upper end of said passage, said fingers being normally yieldingly held projecting over but away from said passage, and a feed-bar moved across the upper end of said passage, said fingers on the side opposite said feed-bar being provided with shoulders upon which the said objects can rest, and being fixed upon a common rock-shaft, the fingers on the side toward the feed-bar being independently movable, substantially as and for the purpose described.

23. In a wrapping-machine, the combination of a package-trough having side guides supported above the bottom of the trough and provided with forwardly-projecting folding ends, means for forcing a package into said trough whereby the said ends fold the wrapper about the rearward vertical edges of the package and the upper and lower flaps of the package pass above and below the guides, and a plurality of fixed reversely-inclined flap engaging and folding devices situated in each guide in different planes transversely of, and at different points along, the said trough so as to successively engage the flaps, the inclined portions of said devices having inwardly beveled or curved surfaces, substantially as described.

24. In a wrapping-machine, the combination of means for folding a wrapper about the upper edges of a package and about the lower and two forward vertical edges thereof, a package-trough having guides supported above the bottom thereof, whereby when the package is forced into said trough the wrapper is folded about the remaining edges of the package and upper and lower flaps are formed on each end thereof, and a plurality of fixed reversely-inclined flap engaging and folding devices situated in each guide in different planes transversely of, and at different points along, the said trough so as to successively engage the flaps, the inclined portions of said devices having inwardly beveled or curved surfaces.

25. In a wrapping-machine, the combination with means for folding a wrapper about a package, said wrapper having projecting ends, of means for advancing said package with its wrapper, means for forming such projecting ends into flaps and folding them against the ends of the package, said last-named means including a plurality of stationary oppositely-inclined portions having inwardly beveled or inclined surfaces located in different planes transversely of, and at different points along, the path of the package, and means in advance of said surfaces for pressing upon said flaps to sharply define the same before folding, substantially as described.

26. In a wrapping-machine the combination of means for folding a wrapper about a package, said wrapper having projecting ends, means for advancing said package with its wrapper, means for forming such projecting ends into flaps, and folding them against the ends of the package, said last-named means including a plurality of stationary oppositely-inclined portions, having beveled or curved inner surfaces, located in different planes transversely of, and at different points along the path of the package, and means to press the flaps before the folding comprising for each flap a pair of strips fixed in a path through which the package is moved, substantially as described.

27. In a wrapping-machine, the combination of means for folding a wrapper about a package, said wrapper having projecting ends, means for advancing said package with its wrapper, means for forming such projecting ends into flaps and folding them against the ends of the package, said last-named means including a plurality of stationary oppositely-inclined portions having inwardly beveled or curved surfaces, located in different planes, transversely of, and at different points along, the path of the package, and means to press the flaps before folding comprising for each flap a pair of strips between which the flap is passed, one of said strips being inclined relatively to the other, substantially as described.

28. In a wrapping-machine, the combination with means for folding a wrapper about a package, and forming thereon oppositely-disposed end flaps, a package-trough through which the packages are adapted to be forced, and a plurality of stationary oppositely-inclined flap-folding portions, formed in each of the side walls of such trough in different planes transversely of, and at different points along, said trough, said portions having inwardly beveled or inclined surfaces, substantially as described.

29. In a wrapping-machine, the combination with a glue-applying device, and means for moving a package to and past the same, of a presser-plate bearing upon a flap of the package to maintain such flap in contact with the said device, and means for moving the said plate along with, and at the same rate of speed as, the package, substantially as described.

30. In a wrapping-machine, the combination with a rotatable glue-applying wheel, and means for moving a package toward and past the same, of a gear, operative connections between the same and the wheel, a rack in mesh with said gear, means for actuating said rack, and a presser-plate on said rack bearing upon a flap of the package to maintain such flap in contact with said wheel, substantially as described.

31. In a wrapping-machine, the combination of means for folding the wrapper about the package and forming flaps on the end thereof, a trough through which said package is adapted to be forced with its flaps projecting therefrom, and means for applying adhesive material to a surface of one of said flaps, which means consists of a glue-carrying device, and a presser-plate, that is adapted to travel with said flap and press the latter upon the glue-carrying device, substantially as described.

32. In a wrapping-machine, the combination of a package-trough through which a package having flaps projecting from its ends can be forced, and a glue-applying device consisting of a glue-wheel, means for moving the upper portion of the periphery of said glue-wheel with the package, and a presser-plate also moving with the package and adapted to press a flap upon the glue-wheel, substantially as described.

33. In a wrapping-machine, the combination of a package-trough having means for applying the wrapper to the package, of means for forcing packages into said trough, and a yielding holdback to prevent a retrograde movement of the package, having two package-engaging surfaces at right angles to each other which bear against the top and back of the package, substantially as and for the purpose described.

34. In a wrapping-machine, the combination of a package-trough having means for applying the wrapper to the package, of means for forcing packages into said trough, and a holdback to prevent a retrograde movement of the package, said holdback consisting of a pivoted arm or arms having a shoulder formed near, but not at its free end, whereby the free end of said arm can rest upon the top of the package and the shoulder drop behind the package, substantially as described.

35. In a sheet-material-feeding mechanism, the combination of a registering-cylinder having pins to engage slots in the sheet material, means for rotating said cylinder and for permitting a slight independent rotative movement thereof, sheet-feeding means, and mechanism for actuating the same relatively to the registering-cylinder, said means having provision to feed the material forward a prescribed length to impart such independent movement to the cylinder by the impingement of the rearward walls of the slots against the pins and then momentarily to release the material, substantially as described.

36. In a sheet-material-feeding mechanism, the combination of a registering-cylinder having pins to engage slots in the sheet material, means for rotating said cylinder and for permitting a slight independent rotative movement thereof, sheet-feeding rolls, and means for actuating the same relatively to the registering-cylinder, one of said rolls having a flattened peripheral portion whereby the material is momentarily released after it has been fed forward a prescribed distance to impart the independent movement to the cylinder, substantially as described.

37. In a sheet-material-feeding mechanism, the combination of a registering-cylinder having on its periphery a series of rows of pins equidistant from each other, and adapted to engage slots in the sheet material, as described, means for rotating said cylinder and for permitting a slight independent rotative movement thereof, sheet-feeding rolls, and means for actuating the same relatively to the registering-cylinder, one of said rolls having a flattened peripheral portion whereby the material is momentarily released after it has been fed forward a prescribed distance to impart the independent movement to the cylinder, substantially as described.

38. In a sheet-material-feeding mechanism, the combination of a registering-cylinder having on its periphery a series of rows of pins equidistant from each other and adapted to engage slots in the sheet material, as described, means for rotating said cylinder and for permitting a slight independent rotative movement thereof, sheet-feeding rolls, means for actuating said rolls relatively to the registering-cylinder, and means between the source of supply of the sheet material and the registering-cylinder for yieldingly holding said material, one of said rolls having a flattened peripheral portion whereby the material is momentarily released after it has been fed forward a prescribed distance to impart the independent movement to the cylinder, substantially as described.

39. In a sheet-material-feeding mechanism, the combination of feed-rolls for the sheet material, one of said feed-rolls having a flattened portion in its periphery for releasing the sheet material, and means for preventing the buckling of the sheet material, consisting of pivoted fingers that are adapted to lie upon the free surface of the sheet material beyond said feed-rolls, substantially as and for the purpose described.

40. In a sheet-material-feeding mechanism, the combination of a bed for supporting the sheet material, means for feeding the sheet material upon said bed, said means consisting of a series of coaxial feed-rolls that are spaced apart, and pivoted fingers that are adapted to extend between said rolls and press the sheet material upon the surface of said bed, substantially as and for the purpose described.

41. In a wrapping-machine, the combination of two parts that are separated by a distance substantially equal to one dimension of the package to be wrapped, forming a passage, package-holding means at one end of said passage, and a series of independently-movable fingers at the same end of said passage to press the package toward the package-holding means, substantially as described.

42. In a wrapping-machine, the combination of two parts that are separated by a distance substantially equal to one dimension of the package to be wrapped, forming a passage, and two series of fingers at one end of said passage on opposite sides thereof, the fingers of which series are independently movable and press the package toward the others, substantially as described.

43. In a wrapping-machine, the combination of wrapper-folding mechanism, including a plunger, and a way for articles to be wrapped, across which the plunger moves, having a wall with an inclined surface next the path of the plunger such surface engaging articles not wholly in position upon the plunger and acting to force them to position thereon, together with means for supporting a wrapper above the plunger, and means for feeding the said articles in parallelism to and progressively upon the face of the plunger and below the wrapper, substantially as described.

44. In a wrapping-machine, the combination of wrapper-folding mechanism, including a plunger, and a way for articles to be wrapped, across which the plunger moves, said plunger having an inclined surface next the way which engages articles in the way not in proper position therein to press them backward, together with means for supporting a wrapper above the plunger, and means for feeding the said articles in parallelism to and progressively upon the face of the plunger and below the wrapper, substantially as described.

45. In a wrapping-machine, the combination of wrapper-folding mechanism, including a plunger, and a way for articles to be wrapped, across which the plunger moves, the plunger having an inclined surface next the way, and a wall of the way having an inclined surface next the plunger said inclined surfaces engaging articles not in proper position to place them in proper position, together with means for supporting a wrapper above the plunger, and means for feeding the said articles in parallelism to and progressively upon the face of the plunger and below the wrapper, substantially as described.

46. In a wrapping-machine, a tension device for the sheet material consisting of a fixed tension-rod, conical collars supported upon said rod, a brake-rod supported by said collars, and means for guiding the sheet material to and from said tension-rod, substantially as and for the purpose described.

47. In a wrapping-machine, the combination of means for applying a line of adhesive material to the wrapper and longitudinally thereof, a groove in the said bed over which the portion of the wrapper having the adhesive material is adapted to pass, and means for folding the lateral edges of the wrapper about the package, the portion of the bed over which the glued portion of the wrapper passes during such folding operation being grooved, so that said glued portion touches the bed only along narrow lines, substantially as and for the purpose described.

48. In a wrapping-machine, the combination of means for applying a line of adhesive material to the wrapper and longitudinally thereof, a groove in the said bed over which the portion of the wrapper having the adhesive material is adapted to pass, and means for folding the lateral edges of the wrapper about the package, the portion of the bed over which the glued portion of the wrapper passes during such folding operation being grooved, so that said glued portion touches the bed only along narrow lines, the walls of said grooves being inclined to facilitate the passage of the wrapper over the grooves, substantially as and for the purpose described.

In testimony that I claim the foregoing I have hereunto set my hand this 22d day of November, 1901.

JACOB P. WRIGHT.

Witnesses:
    B. C. Ross,
    O. A. Tickner.